May 21, 1935.  W. E. URSCHEL  2,002,161
CHERRY STEMMER
Filed March 18, 1932  2 Sheets-Sheet 1

INVENTOR.
William E. Urschel
BY
ATTORNEYS.

May 21, 1935. W. E. URSCHEL 2,002,161
CHERRY STEMMER
Filed March 18, 1932 2 Sheets-Sheet 2
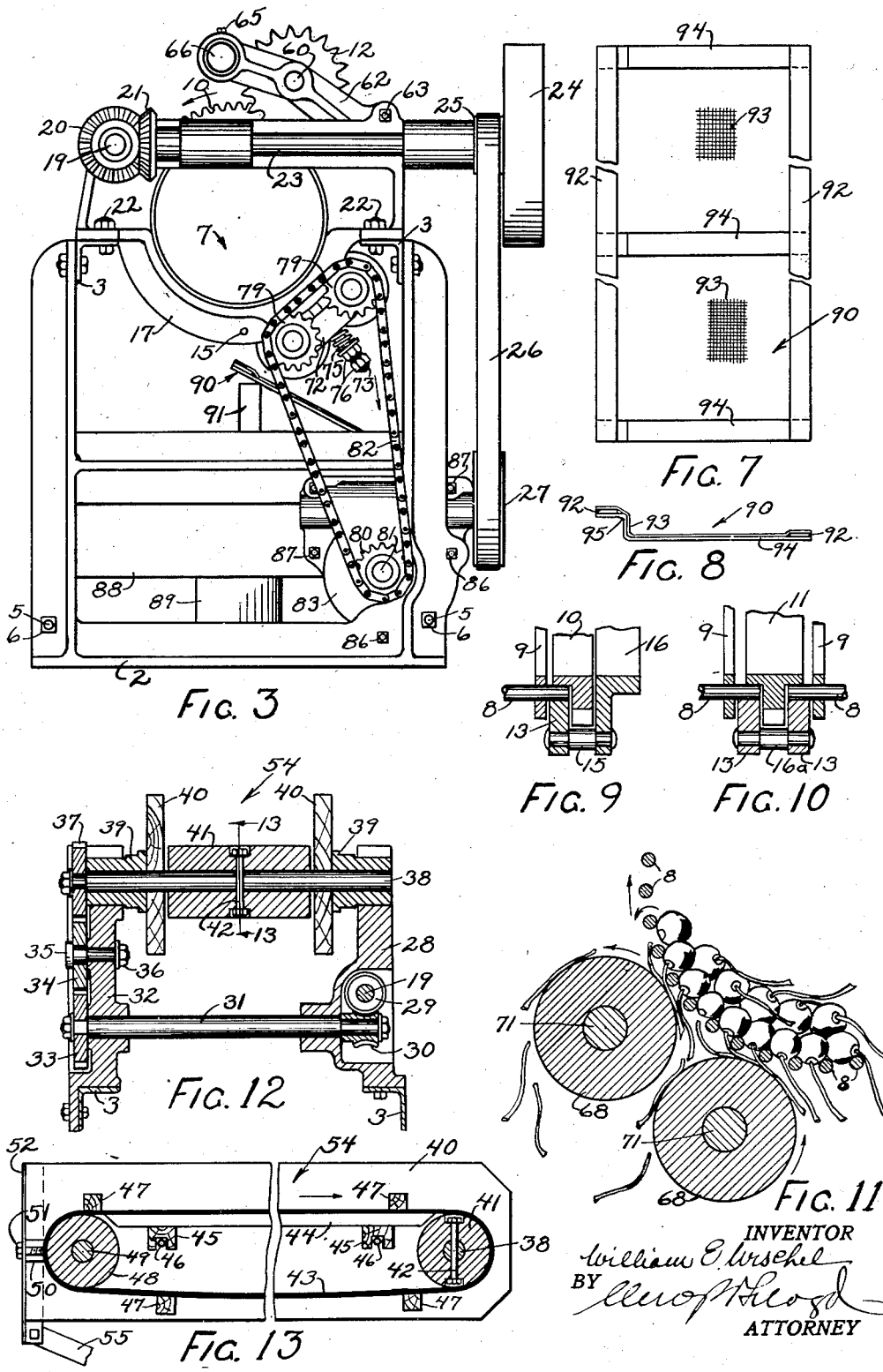
INVENTOR
William E. Urschel
BY
ATTORNEY Patented May 21, 1935

2,002,161

UNITED STATES PATENT OFFICE 2,002,161

CHERRY STEMMER

William E. Urschel, Valparaiso, Ind.

Application March 18, 1932, Serial No. 599,765

10 Claims. (Cl. 146—55)

The present invention relates to an apparatus for stemming and washing fruit, and also to a process which is employed in separating stems from fruit.

Among the objects of the invention are the following:

An improved fruit carrying cylinder disposed in a roller bearing stemming apparatus free from interior shafts or spokes to obstruct the passage of fruit through the said fruit carrying cylinder.

A new means for rotating the rollers of a roller bearing stemming apparatus.

A new means for supporting a fruit carrying cylinder in a roller bearing stemming apparatus whereby to prevent deflection in the center of said cylinder.

A new means of preventing the rollers in a fruit carrying cylinder of a roller bearing stemming apparatus from traveling faster at one end than at the other end, thus overcoming a binding action occurring in the roller rod spacing rings.

An improved means for drawing from fruit the stems thereof protruding from a ribbed fruit carrying cylinder in a roller bearing stemming apparatus and unique means for ridding the drawing means of such stems.

An unique means for automatically feeding fruit to be stemmed into the stemming apparatus.

A clear idea of the several novel features comprising the present invention and of the operation of a machine embodying such invention may be had by referring to the drawings accompanying and forming part of this specification in which like reference characters designate the same or similar parts in the various views.

In said drawings:

Figure 3 is an elevation of the discharge end of the apparatus previously mentioned with the discharge chute removed;

Figure 7 is a plan view of the stem retaining screen;

Figure 8 is an end elevation of the stem retaining screen;

Figure 9 is a partial section taken on the line 9—9 in Figure 2 looking in the direction indicated by the arrows, and showing the arrangement of the different parts at the end of the fruit carrying cylinder;

Figure 10 is a partial section taken on line 10—10 of Figure 4 looking in the direction indicated by the arrows and showing the arrangements of the different parts at intermediate points of the fruit carrying cylinder;

Figure 11 is a diagrammatic view illustrating the method used in removing the stems from fruit;

Figure 12 is a section of the feed elevator and elevator drive taken on the line 12—12 in Figure 1 looking in the direction indicated by the arrows; and Figure 13 is a section of the feed elevator taken on line 13—13 in Figure 12 looking in the direction indicated by the arrows and showing the assembly of the different parts.

Figure 1:
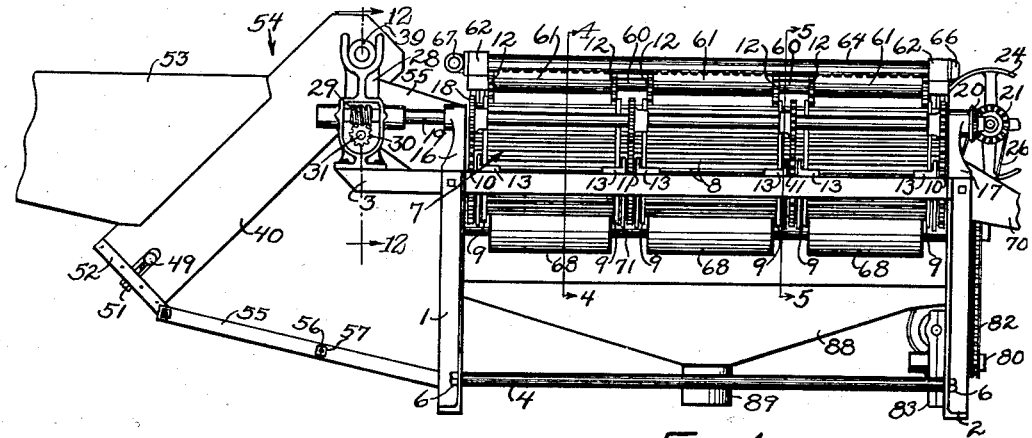
Figure 1 is a side elevation of an apparatus embodying the invention with stem screen and support removed.
Figure 2:
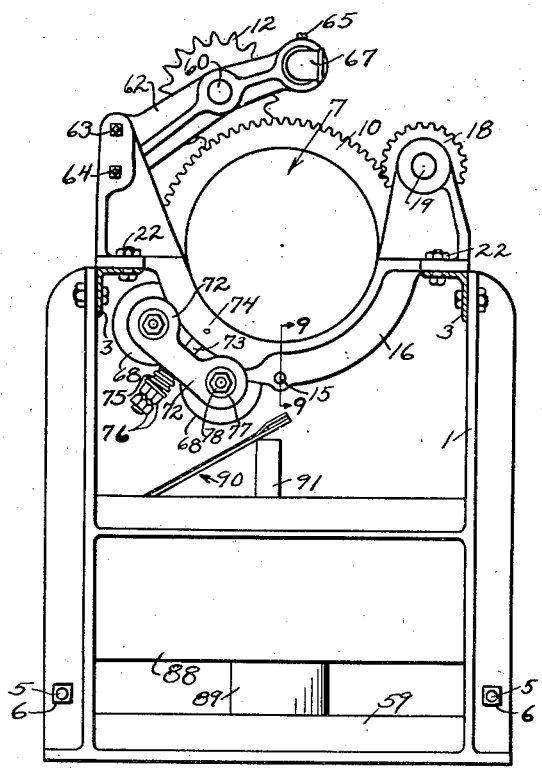
Figure 2 is an elevation of the feed end of the apparatus illustrated in Figure 1 with the feed elevator removed.

Reference should now be had to Figures 1, 2 and 3. A supporting frame for the apparatus consists of two end support members 1 and 2 bolted to two longitudinal members 3, and held in spaced relation at their lower portions by means of spacing members 4 secured by threaded rods 5 and nuts 6.

Figure 4:
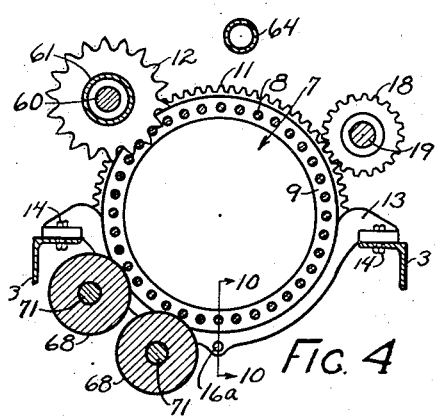
Figure 4 is a sectional view taken on the line 4—4 of Figure 1, the view being in the direction indicated by the arrows, and such view showing the assembled relation of the different parts.
Figure 5:
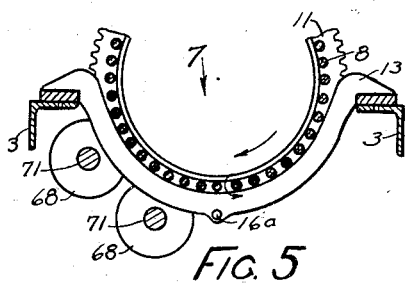
Figure 5 is a section taken on line 5—5 of Figure 1 looking in the direction indicated by the arrows and illustrating the method used to support the fruit carrying cylinder.

A fruit carrying cylinder 7, seen in said Figures 1, 2 and 3, and in Figures 4 and 5 consists of roller rods 8, rod spacing rings 9, end annular drive gears 10, and intermediate annular drive gears 11. In the apparatus shown in the accompanying drawings, the fruit carrying cylinder 7 is composed of three sections although the invention is not limited to any fixed number of sections. The spacing rings 9 at each end of the sections of cylinder 7 hold the roller rods 8 in spaced relation with one another, the distance between these roller rods 8 being governed by the size of the fruit to be stemmed by the apparatus.

The spacing rings 9 are held in position by means of the hereinafter described sprockets 12 and roller rod bearing 13. The roller rod bearings 13 at each end of the sections of the cylinder 7 are bolted to the longitudinal frame members 3 by means of bolts 14. Said roller rod bearings 13 provide a bearing surface for the roller rods to roll upon and at the same time provide a means for supporting the said cylinder 7 in a manner to prevent longitudinal deflection or sagging, insuring free rotation of the roller rods.

The roller rod bearings 13 at each end of the cylinder 7 are also secured to end bearing supports 16 and 17 by means of rivets 15 in the manner shown in Figures 2, 3 and 9. At points common to two sections of the cylinder 7, the roller rod bearings 13 are secured to each other by means of rivets 16a in the manner shown in Figures 4 and 10.

The annular roller rod drive gears 10 and 11 are driven by spur gears 18 keyed to a shaft 19 journalled in the end bearing supports 16 and 17 seen in Figures 1, 2, 3 and 4, which in turn are secured to the longitudinal frame members 3 by bolts 22. Bevel gear 20 (Figures 1 and 3) secured to the said shaft 19 at the end journalled in end bearing support 17 is in meshing relation with, and driven by, a bevel gear 21, keyed to drive shaft 23 which in turn is journalled in the end bearing support 17. A belt pulley 24 secured in a conventional manner to drive shaft 23 furnishes the means of applying the power required to operate the fruit stemming machine. A pulley 25 is also secured to drive shaft 23 and by means of this, a belt 26 drives the hereinafter described belt pulley 27.

Referring to Figures 1 and 12, it can be seen that the shaft 19 is also journalled in an elevator support 28. Keyed to the said shaft 19 is a worm 29 in meshing relation with a worm gear 30 keyed to a transverse shaft 31 journalled in elevator supports 28 and 32. This arrangement enables the shaft 19 to drive said transverse shaft 31 by means of worm 29 and worm gear 30.

Keyed to the other end of the transverse shaft 31 is a spur gear 33 which drives a spur gear 34 rotatably mounted upon a stud 35 secured to the elevator support 32 by a nut 36. The spur gear 34 in turn drives a spur gear 37 keyed to an elevator shaft 38 journalled in bearing blocks 39 secured to elevator guides 40 in a conventional manner.

Referring now to Figure 13, elevator guide members 40 are held in spaced relation by spacing members 45 and secured by bolts 46. Member 44 secured in a conventional manner to the spacing members 45 prevents the loaded conveyor belt 43 from sagging and at the same time acts as a brace providing rigidity to the elevator by keeping the transverse members 45 in spaced relation.

The conveyor belt 43 is driven by the drive roller 41 secured to shaft 38 by the bolt 42, and idles upon a roller 48 rotatably mounted upon a shaft 49 which in turn is reciprocally mounted in slots 50 of guide members 40. Cap-screws 51 reciprocally mounted in angle members 52, secured in a conventional manner to members 40, are fitted in threaded apertures in shaft 49, thus providing a means for keeping the elevator belt 43 taut, or a means to release the tension on said belt 43 to facilitate its removal.

The slats 47 attached to belt 43 in any conventional manner prevent fruit on the elevator belt 43 from sliding back into a conventional feed hopper 53, (see Figure 1) bolted to the members 40. A flap of resilient material (not shown in accompanying drawings) riveted to the bottom of the feed hopper 53 and resting against the belt 43 allows the slats 47 to come up into the hopper 53 without leaving an opening between belt 43 and hopper 53 through which the fruit may escape when the slats 47 do not fill the opening.

Elevator 54 is pivotally mounted in the U-shaped bearings of the elevator supports 28 and 32 by means of bearing blocks 39. This allows the inclination of the elevator 54 to be varied, thus providing a means for controlling the rate at which fruit in hopper 53 is fed into a chute 55, bolted to the elevator supports 28 and 32, which chute in turn feeds the fruit into the fruit carrying cylinder 7.

The angle of inclination of the elevator 54 is controlled by supporting members 55, pivotally secured in a conventional manner to the angle members 52 at one end, and having a series of notches in the other engaging with a rib 59 of end support member 1, shown in Figure 2, the said notches providing a means for fixing the above mentioned inclination. Support members 55 are held in spaced relation by means of a threaded transverse rod 56 and nuts 57.

The rings 9, in Figure 4, hold the roller rods 8, in spaced relation, but to prevent one end of the roller rods 8 from running ahead of the other and thus bind in the rings 9, the sprockets 12 have been used at each end of the sections of the cylinder 7. Each pair of sprockets 12 is rotatably mounted upon a shaft 60, and rigidly secured to each other by tubing 61. The shaft 60 is pinned in supports 62 (see Figures 2 and 3), which in turn are bolted to the end support members 16 and 17 by bolts 63 and 64. The said members 62 also support a spray pipe 64, secured by set screws 65, the said spray pipe 64 being provided with a series of openings along its lower edge, a cap 66 at one end, and an L connection 67, at the other.

The above arrangement provides a means for washing the fruit in the cylinder 7 while the fruit is passing through the apparatus. The sprockets 12 and the spray pipe 64 may be swung out of position by removing the bolts 63 and revolving the supports 62 about the bolts 64 to facilitate the removal of cylinder 7.

Referring now to Figures 4, 5 and 11, it will be noted that the gears 18 drive the annular gears 11, which press against the roller rods 8 causing them to roll along the rod bearings 13. Since the roller rods 8 are held in spaced relation by the rings 9 the movement of the roller rods along the bearings 13, will cause the cylinder 7 to rotate in the direction of the travel of the roller rods.

As the said cylinder 7 rotates, the fruit therein tumbles around and the stems protrude through the openings between the roller rods 8 as shown in Figure 11. The protruding stems are held first between the resilient rolls 68 and a roller rod 8 and then by succeeding roller rods 8, holding the stem practically stationary while the fruit moves on causing the held stem to separate from the fruit.

Although the rolls 68 revolve, their speed of rotation is very slow, just enough to clear away the loosened stems. The apparatus is inclined longitudinally toward a discharge chute 70, (see Figure 1) causing the stemmed fruit to be carried to the end of the cylinder 7, roll into the discharge chute 70, and to leave the apparatus stemmed and washed.

The rolls 68 made of a resilient material are secured in a conventional manner to shafts 71 journalled in bearings 72, (shown in Figures 2 and 3) which are secured at one end by a washer 77 and nuts 78 and at the other by chain sprockets 79. Bearings 72 are reciprocally mounted upon studs 73 secured to the members 16 and 17 by pins 74.

Springs 75 are resiliently mounted upon the studs 73 bear against the bearings 72 providing means for holding the rolls 68 against the roller rods 8 with only enough pressure to stem the fruit and also to allow the said rolls to move away from the roller rods in case some hard foreign substance becomes lodged between them. Tension on the springs 75 is adjusted by means of nuts 76.

Figure 6:
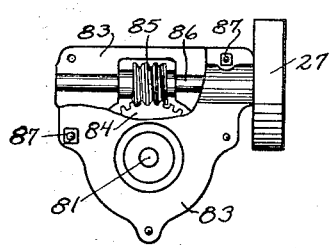
Figure 6 is a view of the stemming roll drive in partial section.

A chain sprocket 80 keyed to a shaft 81, journalled in a gear box 83, drives the heretofore mentioned sprockets 79 by means of drive chain 82. Worm gear 84, (see Figure 6) is also keyed to shaft 81 and is driven by worm 85, keyed to a shaft 86 also journalled in the box 83. The belt pulley 27 keyed to shaft 86 and driven by the heretofore mentioned belt 26, (see Figure 3) furnishes the means to slowly rotate the stemming rolls 68. The gear box 83 is secured to the end support 2 by bolts 86, which also secure the two halves of the box 83, as do bolts 87.

The water used in the apparatus to wash the fruit drains into tank 88, (see Figure 1) and is discharged through a drain 89. To prevent the stems discharged by the stemming rolls 68 from falling into tank 88 and clogging drain 89, a screen 90 (see Figures 2, 3, 7 and 8) supported by a longitudinal member 91 secured in a conventional manner to said tank 88, has been provided.

The said screen 90, (see Figures 7 and 8) is made up of the two longitudinal members 92 and a plurality of lateral members 94, secured in a conventional manner and covered with a fine mesh screen 93. The screen 90 simply rests upon the member 91, and on the edge of tank 88 at points 95 on the screen, making it an easy operation to remove the screen for cleaning.

The invention has provided a track in the interior of the fruit carrying cylinder of a roller bearing fruit stemming apparatus, for the roller rods to roll upon without supports in the interior of the said cylinder. The absence of supports or spokes in the interior of the fruit carrying cylinder has eliminated the possibility of soft fruit being bruised while tumbling in said cylinder, since the presence of spokes or supports in the cylinder caused some of the fruit to be carried over when caught by a spoke or interior support and thrown against the wall of the cylinder with sufficient force to either bruise or crush the said fruit. The elimination of bruising due to spokes or interior supports by the elimination of such spokes or supports has allowed the speed of rotation of the fruit carrying cylinder to be increased without injury to the fruit therein, thus increasing the capacity and efficiency of the apparatus.

Another feature of the invention is the manner in which the loosened stems are discharged from the machine automatically, thus dispensing with the need of having an attendant to keep the stemming mechanism free from the accumulation of loosened stems.

These and other features mentioned in the accompanying specification tend to make the machine one that can be readily manufactured and at the same time a machine that will be easy to operate and maintain with a minimum amount of attention.

What I claim as new and desire to secure by Letters Patent in the United States is:

1. A stemming device comprising a drum of rollers between which the stems of fruit project, bearings at spaced intervals about said drum and engaging said rollers to cause them to rotate, and other rollers in juxtaposition to the first mentioned rollers and rotating at a lower speed than said first mentioned rollers, the space between the different rollers being such that the stems of fruit are engaged between said different rollers to assist in the severance of the stems.

2. In a stemming device, a drum of rollers between which the stems of fruit project, rotating means for said drum, means for rotating said drum rollers, and rollers of resilient material adjacent and engaging said drum rollers, said resilient rollers traveling at a lower speed than said drum rollers.

3. A stemming device comprising a drum of rollers, driving means therefor, means for rotating said rollers, a second series of rollers engaging said first mentioned rollers, and means for rotating said second series of rollers at a lower speed than said driving rollers.

4. In a fruit stemming device, a series of supports for rods, a series of rods in said supports and arranged in the form of a cylinder, means for rotating said rods and said supports, and rotatable resilient gripping means rotating in the same direction as said rods and in juxtaposition thereto.

5. Fruit stemming apparatus comprising collars, a series of rods in said collars, said rods being in spaced relation and being adapted to rotate freely in said collars, means for rotating said collars, a bearing surface on which said rods are adapted to roll, and rotatable resilient gripping means rotating in the same direction as said rods and in juxtaposition thereto.

6. In a fruit stemmer, collars, means for rotating said collars, roller bars on said collars in spaced relation and freely rotatable therein, a bearing surface to engage said rods for rotation when said collars are rotated, and rotatable resilient gripping means rotating in the same direction as said rods and in juxtaposition thereto.

7. A fruit stemmer comprising collars, means for rotating said collars, roller rods in said collars and free to rotate therein, a face to engage said rods to cause them to rotate, other rollers of resilient material engaging said first mentioned roller rods, and means for rotating the resilient rods at a lower speed than the speed of said roller rods, said resilient rods being mounted for movement away from said rollers rods.

8. A stemming device comprising spaced apart collars, rods in spaced relation in said collars, said rods being free to rotate in said collars, means for driving said collars, a bearing surface engaging said rollers to cause their rotation as said collars revolve and in a direction opposite to that of the collars, and resilient rollers engaging said rollers rods, said resilient rollers having a mounting admitting of relative movement thereof away from said roller rods, the resilient rods being at the side of said drum and away from the under side thereof and being rotated at a speed different from the speed of rotation of said rollers.

9. In a fruit stemming device, a plurality of support members having internal arcuate bearing surfaces, in combination with a rotatable cylinder comprising annular spacer members having a series of bearings therein, and a series of spaced parallel rods forming the side wall of said cylinder and being journalled in said bearings, there being sections of said rods upon the arcuate bearing surfaces of said support members to cause rotation of said rods in their respective bearings incident to rotation of said cylinder, and cylinder rotating means comprising a ring gear of substantially the same internal diameter as said cylinder and disposed coaxially of said cylinder in driving relation therewith.

10. In a fruit stemming device, a rotatable cylinder comprising annular spacer members having a series of bearings therein, a series of parallel spaced rods forming the side wall of said cylinder and journalled in the bearings of said spacer members, cylinder rotating means comprising a ring gear of substantially the same internal diameter as said cylinder and disposed coaxially thereof in driving relation therewith, cylinder support members having arcuate surfaces engaging sections of said rods to cause rotation thereof during rotation of said cylinder, the rotation of the cylinder and rods agitating the fruit within the cylinder whereby the stems of the fruit may project outwardly between said rods, and stem extracting means cooperating with the exterior of the wall of said cylinder to detach the projecting stems.

WILLIAM E. URSCHEL.